United States Patent [19]
Rack et al.

[11] Patent Number: 5,581,150
[45] Date of Patent: Dec. 3, 1996

[54] TFEL DEVICE WITH INJECTION LAYER

[75] Inventors: Philip D. Rack; Paul H. Holloway, both of Gainesville, Fla.; Sey-Shing Sun; Eric R. Dickey, both of Beaverton, Oreg.; Christian F. Schaus; Richard T. Tuenge, both of Hillsboro, Oreg.; Christopher N. King, Portland, Oreg.

[73] Assignee: Planar Systems, Inc., Beaverton, Oreg.

[21] Appl. No.: 542,520

[22] Filed: Oct. 13, 1995

[51] Int. Cl.$^6$ ............................ H01J 1/62; H01J 63/04
[52] U.S. Cl. ............... 313/509; 313/506; 428/917
[58] Field of Search .................... 313/503, 504, 313/506, 507, 509, 511, 512; 428/917

[56] References Cited

U.S. PATENT DOCUMENTS

| | | | |
|---|---|---|---|
| 4,719,385 | 1/1988 | Barrow et al. | 313/463 |
| 4,751,427 | 6/1988 | Barrow et al. | 313/503 |
| 4,897,319 | 1/1990 | Sun | 428/690 |
| 5,059,861 | 10/1991 | Littman et al. | 313/503 |
| 5,309,070 | 5/1994 | Sun et al. | 313/503 |

OTHER PUBLICATIONS

Modification of Dielectric–Phosphor Interface in A.C. Thin Film Electroluminescent Display Devices, Britton et al., published at least as early as Oct. 13, 1994, pp. 286–291.

Stacked Insulator Structure Thin–Film Electroluminescent Display Devices, Ohwaki et al., J. Electrochem So., vol. 137, No. 1, pp. 340–342.

Thin Film ZnS:Mn AC–Electroluminescent Device with a Ge Layer, Kobayashi et al., IEEE Transactions on Electron Devices, vol. ED–29, No. 10, Oct. 1982 pp. 1626–1630.

Electrical characterization of blue electroluminescent devices, Pham et al., "Advanced Flat Panel Display Technologies," SPIE 2174, 1994, pp. 190–199.

*Primary Examiner*—Louis M. Arana
*Assistant Examiner*—Mack Haynes
*Attorney, Agent, or Firm*—Chernoff, Vilhauer, McClung & Stenzel

[57] ABSTRACT

A TFEL structure is disclosed that includes first and second electrode layers sandwiching a TFEL stack including at least one insulator layer and a novel three layer laminate structure. The three-layer laminate structure includes an alkaline earth thiogallate phosphor layer, a nucleating layer and an injection layer. The nucleating layer lies between the phosphor layer and the injection layer. The injection layer provides a charge injection function through the nucleating layer for the thiogallate phosphor layer which is of high crystallinity at its interface with the nucleating layer. A preferred injection layer includes indium, for example as the metal or as indium tin oxide. The best material for the nucleating layer is zinc sulfide.

21 Claims, 1 Drawing Sheet

TFEL DEVICE WITH INJECTION LAYER

The following invention relates to a thin-film electroluminescent (TFEL) device and in particular to a TFEL device including an alkaline earth thiogallate phosphor.

BACKGROUND AND SUMMARY OF THE INVENTION

An AC TFEL device is a laminar structure comprising an electroluminescent phosphor material sandwiched by insulators and sets of front and rear electrodes. Typically, the insulators and electrodes which are positioned between the viewer and the phosphor are transparent. Thus, the laminar structure may be fabricated either on an opaque substrate and covered by a glass panel for film-side viewing or the structure may be fabricated directly on a transparent substrate for substrate-side viewing. It has long been a desirable object to provide a full color TFEL device, but to do so requires the generation of light of the three primary colors, red, green and blue.

Blue light is the most difficult of the primary colors to produce. For more than a decade research groups have searched for a phosphor that produces blue light having the desired chromaticity and sufficient luminescence to produce an efficient blue light-emitting TFEL structure. An early type of such a structure is shown in Barrow et al. U.S. Pat. No. 4,751,427. In the M. H. Barrow patent a blue light-emitting phosphor comprising strontium sulfide doped with cerium fluoride is sandwiched by a pair of zinc sulfide layers which are characterized as carrier injection layers. Unfortunately, strontium sulfide is hygroscopic and chemically unstable.

A considerable improvement over the aforementioned cerium-doped strontium sulfide device include an alkaline earth thiogallate phosphor doped with cerium to provide a blue light emitting center. A TFEL structure employing such a thiogallate phosphor is described in Sun et al U.S. Pat. No. 5,309,070. The M. H. alkaline earth thiogallate typically is deposited as an amorphous film which must be annealed to produce a crystalline phosphor. The crystalline structure of the thiogallate is improved by annealing the thiogallate in contact with a ZnS layer. The ZnS layer was originally thought to provide a carrier injection function, but more recently it has been realized that its real function is to act as a nucleation enhancer to help transform the amorphous thiogallate into crystalline form.

Investigators have examined the possibility of providing charge injection layers for other AC TFEL devices, particularly those employing a conventional zinc sulfide phosphor doped with manganese. For example, Kobayashi et al., in *IEEE Transactions on Electron Devices* 29, 1626 (1982), and Ohwaki et al., in *Electrochemical Soc.* 137, 340 (1990), investigated, respectively, the use of germanium and silicon dioxide as charge injection layers. Still later, Britton et al., in *Proc. of the Sixth Int'l Workshop on Electroluminescence*, 286–91 (1992), investigated using thin layers of aluminum to modify the insulator-phosphor interface to promote charge injection into a ZnS:Mn system. These studies produced mixed results. Britton and Ohwaki demonstrated increased brightness of the devices employing the charge injection layer over the respective study's control devices. However, Kobayashi reported an increase in conduction charge, but a decrease in the brightness due to a reduction in the local electric field in the devices with the germanium injection layer compared to the control devices. Thus, with respect to these devices, researchers have been unable to confirm the efficacy of purported charge injection layers.

A considerable improvement in the performance of thiogallate phosphors has now been made possible by the present invention. According to the invention a thin film electroluminescent structure for emitting light in response to the application of an electric field includes first and second electrode layers sandwiching a TFEL stack including at least one insulator layer and a three layer laminate structure. The three layer laminate structure includes a phosphor layer containing an alkaline earth thiogallate, a nucleating layer and an injection layer. The nucleating layer lies between the phosphor layer and the injection layer. The injection layer provides a charge injection function through the nucleating layer for the thiogallate phosphor layer which is of high crystallinity at its interface with the nucleating layer. A preferred injection layer includes indium, for example as the metal or as indium tin oxide. The best material for the nucleating layer is zinc sulfide.

The foregoing and other objectives, features, and advantages of the invention will be more readily understood upon consideration of the following detailed description of the invention, taken in conjunction with the accompanying drawing.

DETAILED DESCRIPTION OF THE PREFERRED EMBODIMENT

Figure 1:
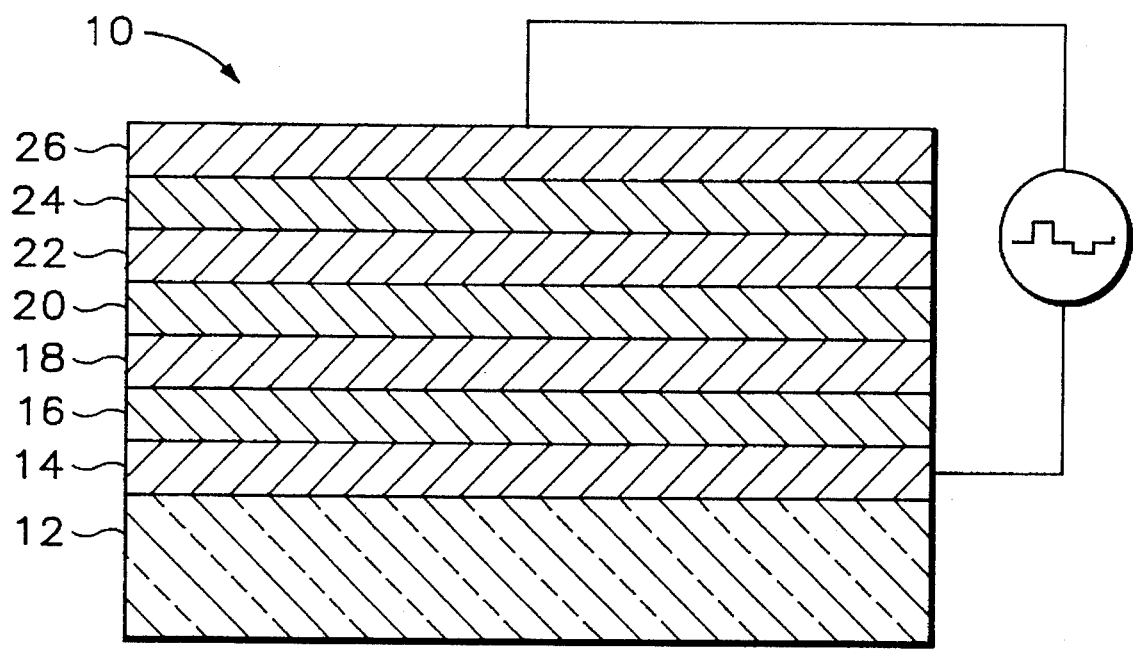
FIG. 1 is a sectional view of a TFEL device embodying the present invention.

Referring to the drawing, a TFEL device 10 fabricated according to the present invention has a glass substrate 12 which supports a transparent indium tin oxide (ITO) electrode layer 14 as a set of thin elongate electrode members. Deposited on top of the ITO electrode layer 14 is an insulator layer 16 having a total thickness of about 3000 Å (300 nm), such as alternating layers of alumina and titania (ATO).

An injection layer 18 is deposited on top of the insulator layer 16, preferably by sputtering, or alternatively by thermal evaporation or electron beam evaporation. The preferred injection layer is indium or ITO, and is 10–100 Å thick (1–10 nm). A nucleating layer 20 is deposited on top of the injection layer 18. The nucleating layer is preferably a zinc-containing compound and most preferably is a layer of zinc sulfide which is between 100 and 500 Å (10–50 nm) thick. A phosphor layer 22 is deposited atop the nucleating layer 20. The phosphor is an alkaline earth thiogallate including a rare earth dopant and is preferably deposited by sputtering from the appropriate target. The alkaline earth is selected from the group calcium, strontium, barium and magnesium. A preferred thiogallate is $Ca_xSr_{1-x}Ga_2S_4$, where $0 \leq x \leq 1$. Thus, the thiogallate may be calcium thiogallate (x=1), strontium thiogallate (x=0) or calcium strontium thiogallate (0<x<1). For blue light emission the phosphor is preferably calcium strontium thiogallate (0<x<1) and includes the rare earth dopant cerium. For green light emission the phosphor may be europium-doped strontium thiogallate, and for red light emission the phosphor may be a manganese-doped alkaline earth thiogallate. The phosphor layer 22 is covered with a second insulator layer 24, for example a barium tantallate (BTO) layer that is about 3000 Å (300 nm) thick. A second electrode layer 26, made of thin elongate aluminum members, is formed on the second insulator layer 24 at right angles to the members of the first electrode set.

Subsequent to the deposition of the alkaline earth thiogallate phosphor layer 22 the thin film stack is annealed to crystalize the amorphous as-deposited thiogallate layer. The thin-film stack is annealed in nitrogen at a temperature greater than 650° C., for example as disclosed in U.S. Pat. No. 4,900,548, which is hereby incorporated by reference. A preferred annealing temperature range is between 750° and 850° C. The most preferred annealing temperature is 810° C.

The nucleating layer 20 initiates the crystallization of the thiogallate. While the exact mechanism for this initiation is not known, it is thought that, for example, when the nucleating layer is zinc sulfide, during the anneal a small amount of zinc diffuses from the sulfide layer into the thiogallate layer to form zinc thiogallate microcrystals. These microcrystals then act as seeds for the formation of calcium and strontium thiogallate crystals. It is also thought that during annealing at least a portion of the injection layer 18 diffuses into the nucleating layer 20. This modifies the electrical properties of the nucleating layer and creates an electron donor level in which electrons under an applied bias are trapped at the interface between the nucleating layer and the phosphor, thus increasing the occupied state density. Under the applied bias the trapped electrons are tunnel injected from the interface into the phosphor. Thus, the injection layer 18 may be any material that can serve as an electron donor to modify the nucleating layer by introducing a donor level.

The performance of a device fabricated according to the present invention, which included a cerium-doped calcium strontium thiogallate phosphor layer, a zinc sulfide nucleating layer and an indium injection layer about 30 Å thick, was compared to the performance of a similarly prepared device which did not include an injection layer. The threshold voltage and the luminance 40 volts above threshold, $L_{40}$, of the devices was measured. The device which included the indium injection layer demonstrated an increase in brightness and a decrease in threshold voltage. The results of these measurements are set forth in Table 1.

TABLE 1

| Injection Layer (indium) | Threshold Voltage (V) | $L_{40}$ (fL) |
| --- | --- | --- |
| No | 174 | 0.78 |
| Yes | 156 | 0.95 |

Phosphor brightness is a linear function of phosphor thickness. Thus, by decreasing the threshold voltage, the phosphor layer may be deposited in a thicker layer to provide a brighter phosphor at a given threshold voltage. In addition, the conduction charge increases from 330 nC in the device without an indium injection layer, to 420 nC in the device including the indium injection layer.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A thin film electroluminescent (TFEL) structure for emitting light in response to the application of an electric field, comprising first and second electrode layers sandwiching a TFEL stack including at least one insulator layer and a laminate structure comprising a phosphor layer including an alkaline earth thiogallate, a nucleating layer and an injection layer wherein the nucleating layer lies between the phosphor layer and the injection layer, wherein the nucleating layer and the injection layer comprise different materials.

2. The TFEL structure of claim 1 wherein the injection layer comprises indium.

3. The TFEL structure of claim 1 wherein the nucleating layer comprises zinc.

4. The TFEL structure of claim 1 wherein the phosphor layer is a blue light emitting alkaline earth thiogallate phosphor.

5. The TFEL structure of claim 1 wherein the laminate structure is sandwiched by a pair of insulator layers.

6. The TFEL structure of claim 1 wherein at least a portion of said injection layer is diffused into said nucleating layer.

7. The TFEL structure of claim 1 wherein said first and second electrode layers comprise respectively sets of thin elongate electrode members, the electrode members of said first set being oriented at right angles to the electrode members of said second set.

8. A TFEL structure for emitting light in response to the application in the electric field, comprising:
 (a) an electroluminescent phosphor layer;
 (b) an electron injection layer;
 (c) a nucleating layer sandwiched between said phosphor layer and said electron injection layer said nucleating layer being made of a material different from said electron injection layer;
 (d) a first insulator layer and a second insulator layer sandwiching said phosphor layer and said electron injection layer; and
 (e) a first electrode layer and a second electrode layer sandwiching said first and second insulator layers.

9. The TFEL structure of claim 8 wherein said first electrode layer is a transparent electrode layer deposited on a transparent substrate.

10. The TFEL structure of claim 8 wherein said nucleating layer is zinc sulfide.

11. The TFEL structure of claim 8 wherein the electroluminescent phosphor layer comprises an alkaline earth thiogallate.

12. The TFEL structure of claim 8 wherein said electron injection layer comprises indium.

13. A method of making a TFEL structure for emitting light in response to the application of an electric field, comprising:
 (a) depositing a first electrode set on a transparent substrate;
 (b) depositing a first insulator layer on said first electrode set;
 (c) depositing an electron injection layer on said first insulator layer;
 (d) depositing a nucleating layer on said electron injection layer;
 (e) depositing on said nucleating layer a layer of a phosphor comprising an alkaline earth thiogallate and crystallizing said alkaline earth thiogallate;
 (f) depositing a second insulator layer on said phosphor; and
 (g) depositing a second electrode set on said second insulator layer.

14. The method of claim 13 wherein said electron injection layer includes indium.

15. The method of claim 13 wherein said alkaline earth thiogallate is calcium strontium thiogallate.

16. The method of claim 13 wherein said nucleating layer is zinc sulfide.

17. The method of claim 13 wherein in step (e) said alkaline earth thiogallate is crystallized by annealing.

18. A TFEL structure for emitting light in response to the application of an electric field comprising:

(a) an electroluminescent phosphor layer comprising an alkaline earth thiogallate;

(b) an electron injection layer containing an electron donor material;

(c) a nucleating layer containing a material that causes crystallization of said alkaline earth thiogallate upon annealing, said nucleating layer disposed between said electron injection layer and said electroluminescent phosphor layer;

(d) a first insulator layer and a second insulator layer sandwiching said electroluminescent phosphor layer and said electron injection layer respectively; and (e) a first electrode layer and a second electrode layer sandwiching said first and second insulating layers respectively.

19. The TFEL structure of claim 18 wherein said alkaline earth thiogallate is represented by the formula $Ca_x Sr_{1-x} Ga_2 S_4$ where $1 \geq X \geq 0$.

20. The TFEL structure of claim 18 wherein the electron injection layer comprises indium.

21. The TFEL structure of claim 18 wherein the nucleating layer comprises zinc.

* * * * *